(12) United States Patent
Kato (10) Patent No.: US 7,513,105 B2
(45) Date of Patent: Apr. 7, 2009

(54) EXHAUST GAS PURIFYING SYSTEM AND ABNORMALITY DETERMINING METHOD THEREFOR

(75) Inventor: Kazunori Kato, Novi, MI (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 165 days.

(21) Appl. No.: 11/598,050

(22) Filed: Nov. 13, 2006

(65) Prior Publication Data

US 2007/0113538 A1 May 24, 2007

(30) Foreign Application Priority Data

Nov. 18, 2005 (JP) ............ 2005-333882
Nov. 9, 2006 (JP) ............ 2006-303677

(51) Int. Cl.
*F01N 3/00* (2006.01)

(52) U.S. Cl. ............ 60/277; 60/274; 60/276; 60/285; 701/103; 701/109; 123/672

(58) Field of Classification Search ............ 60/274, 60/276, 277, 285; 701/103, 109; 123/672, 123/688
See application file for complete search history.

(56) References Cited

U.S. PATENT DOCUMENTS

| | | | | |
|---|---|---|---|---|
| 4,745,741 A | * | 5/1988 | Masui et al. | 60/274 |
| 5,568,725 A | * | 10/1996 | Uchikawa | 60/274 |
| 6,449,944 B1 | * | 9/2002 | Yasui et al. | 60/277 |
| 6,711,932 B2 | * | 3/2004 | Iwazaki et al. | 73/1.06 |
| 6,901,744 B2 | * | 6/2005 | Kako et al. | 60/285 |
| 6,915,203 B2 | * | 7/2005 | Maegawa et al. | 701/114 |
| 7,131,261 B2 | | 11/2006 | Wackerow et al. | |
| 2004/0134185 A1 | | 7/2004 | Wackerow et al. | |

FOREIGN PATENT DOCUMENTS

| | | |
|---|---|---|
| DE | 10218015 | 11/2003 |
| JP | A 5-133264 | 5/1993 |
| JP | A 2003-097334 | 4/2003 |

OTHER PUBLICATIONS v. Basshuysen, R; Schafer, F.: Manual Verbrennungsmotor, 2nd Edition, Vieweg, 2002, pp. 559-560.

* cited by examiner

*Primary Examiner*—Binh Q. Tran
(74) *Attorney, Agent, or Firm*—Oliff & Berridge, PLC (57) ABSTRACT

An exhaust gas purifying system includes a catalyst arranged on an exhaust pipe of an internal combustion engine; a sensor detecting a state of the exhaust gas passed through the catalyst; and an ECU functioning as an abnormality determining apparatus determining abnormality by monitoring an output of said sensor in an operation under forced air-fuel ratio. When the operation under forced air-fuel control is interrupted before completion of the determination of system abnormality, the abnormality determining apparatus once stores a parameter accumulated during the operation under forced air-fuel ratio control by the time of interruption, and when the internal combustion engine comes to satisfy the prescribed condition again, resumes the operation under forced air-fuel ratio control, and completes determination of system abnormality using the stored parameter and the parameter accumulated after resumption of the forced air-fuel ratio control.

8 Claims, 6 Drawing Sheets

EXHAUST GAS PURIFYING SYSTEM AND ABNORMALITY DETERMINING METHOD THEREFOR

This nonprovisional application is based on Japanese Patent Application Nos. 2005-333882 and 2006-303677 filed with the Japan Patent Office on Nov. 18, 2005 and Nov. 9, 2006, respectively the entire contents of which are incorporated by reference.

BACKGROUND OF THE INVENTION

1. Field of the Invention

The present invention relates to an exhaust gas purifying system and an abnormality determining method therefor. Particularly, the present invention relates to an exhaust gas purifying system for purifying exhaust gas of an internal combustion engine mounted on a vehicle, and to a method of determining abnormality thereof.

2. Description of the Background Art

In an exhaust gas purifying system of an internal combustion engine to be mounted on a vehicle, a catalyst is arranged on an exhaust pipe, for purifying exhaust gas. The catalyst is capable of taking and storing an appropriate amount of oxygen, and when the exhaust gas contains unburned component such as hydrocarbon (HC) or carbon monoxide (CO), the catalyst oxidizes such component using the stored oxygen. When the exhaust gas contains oxide such as nitrogen oxide (NOx), the catalyst reduces such substance, and takes and stores the resulting oxygen.

The catalyst arranged on the exhaust pipe purifies the exhaust gas in this manner. Therefore, the purifying capability of the catalyst much depends on the oxygen storage capability. Therefore, deterioration of the purifying capability of the catalyst can be determined by the maximum amount of oxygen that can be taken and stored in the catalyst, that is, the oxygen storage capacity.

Japanese Patent Laying-Open No. 2003-97334 discloses an apparatus for detecting oxygen storage capacity of the catalyst arranged on the exhaust pipe through forced air-fuel ratio control in which the air-fuel ratio of air-fuel mixture supplied to the internal combustion engine, normally adjusted around the stoichiometric air-fuel ratio, is forced to fuel-rich or fuel-lean.

The forced air-fuel ratio control will be described. When the air-fuel ratio is fuel-rich, an exhaust gas with low oxygen, containing unburned component such as HC or CO, is supplied to the catalyst. When such an exhaust gas is supplied, the catalyst emits oxygen that has been stored, to purify the exhaust gas. Therefore, when such a state continues for a long time, the catalyst eventually emits all the oxygen, and reaches a state in which oxidation of HC or CO is no longer possible. In the following, this state will be referred to as a "state of minimum oxygen storage."

When the air-fuel ratio is fuel-lean, an exhaust gas with excessively high oxygen, containing NOx, is supplied to the catalyst. When such an exhaust gas is supplied, the catalyst takes and stores the excessive oxygen in the exhaust gas, to purify the exhaust gas. Therefore, when such a state continues for a long time, the catalyst eventually stores the oxygen to the full capacity, and reaches a state in which purification of NOx is no longer possible. In the following, this state will be referred to as a "state of maximum oxygen storage."

In the forced air-fuel ratio control, the air-fuel ratio of the air-fuel mixture, which is normally adjusted around the stoichiometric air-fuel ratio, is controlled such that the state of minimum oxygen storage and the state of maximum oxygen storage are realized repeatedly. The amount of oxygen taken and stored in the catalyst in the process of transition from the state of minimum oxygen storage to the state of maximum oxygen storage, or the amount of oxygen emitted from the catalyst in the process of transition in the opposite direction is accumulated, to find the oxygen storage capacity. Whether the catalyst is normal or deteriorated is determined based on whether the thus found oxygen storage capacity is larger than a prescribed determination value or not.

When the forced air-fuel control described above is to be executed, it is necessary that the internal combustion engine satisfy prescribed operating conditions. By way of example, when stable engine operation conditions can continuously be maintained as in the case of driving down a highway, the air-fuel ratio control can be performed without causing any problem.

When the engine speed or the amount of intake air frequently goes out of a prescribed range as experienced when driving through town, operating condition of the engine is unstable. Therefore, it is disadvantageous to make determination as to whether the catalyst of the exhaust gas purifying system is normal or deteriorated, through forced air-fuel ratio control.

Recently, in some vehicles, fuel is cut during down-hill driving for better mileage. When the forced air-fuel ratio control is conducted while the fuel is cut, the improved mileage would be wasted.

Therefore, while the forced air-fuel ratio control is being done and the prescribed operating conditions come to be no longer satisfied, the forced control is interrupted. Thus, it becomes impossible to complete determination as to whether the catalyst of the exhaust purifying system is deteriorated or not.

Even when the prescribed operating conditions are satisfied again and the forced air-fuel ratio control is done after interruption, whether the prescribed operating conditions are kept for the necessary time period or not is unknown, as the transition from the state of minimum oxygen storage to the state of maximum oxygen storage, or transition from the state of maximum oxygen storage to the state of minimum oxygen storage can take some time, for example, 30 to 40 seconds.

The oxygen storage capacity of the catalyst is determined using an output of an oxygen sensor detecting oxygen in the exhaust gas after passage through the catalyst. If the oxygen sensor fails, whether the catalyst is deteriorated or not cannot be determined accurately. Therefore, it is also necessary to determine a failure of the oxygen sensor as abnormality of the system.

SUMMARY OF THE INVENTION

An object of the present invention is to provide an exhaust gas purifying system in which possibility of successfully completing abnormality determination is improved.

In summary, the present invention provides an exhaust gas purifying system, including: a catalyst arranged on an exhaust pipe of an internal combustion engine; a sensor detecting a state of the exhaust gas passed through the catalyst; and an abnormality determining apparatus determining abnormality of the system by monitoring an output of the sensor in an operation under forced air-fuel ratio control executed when the internal combustion engine satisfies a prescribed condition, in which air-fuel ratio of intake air supplied to the internal combustion engine is forced to increase/decrease. When the operation under forced air-fuel control is interrupted before completion of the determination of abnormality of the system, the abnormality determining apparatus once stores a parameter accumulated during the operation under forced air-fuel ratio control by the time of interruption, and when the internal combustion engine comes to satisfy the prescribed condition again, resumes the operation under forced air-fuel ratio control, and completes determination of the system abnormality using the stored parameter and parameter accumulated after resumption of the forced air-fuel ratio control.

Preferably, the abnormality determining apparatus performs a process of correcting the parameter corresponding to the interruption period of the operation under forced air-fuel ratio control, and continues accumulation of the parameter after resumption of the operation under forced air-fuel ratio control.

Preferably, the parameter is oxygen storage amount of the catalyst accumulated based on air-fuel ratio and time.

More preferably, the sensor is an oxygen sensor detecting oxygen in the exhaust gas, and the abnormality determining apparatus detects abnormality of the system by monitoring an output of the oxygen sensor when the oxygen storage amount exceeds a prescribed value.

According to another aspect, the present invention provides a method of determining abnormality of an exhaust gas purifying system including a catalyst arranged on an exhaust pipe of an internal combustion engine and a sensor detecting a state of the exhaust passed through the catalyst, for determining abnormality of the system by monitoring an output of the sensor in an operation under forced air-fuel ratio control executed when the internal combustion engine satisfies a prescribed condition, in which air-fuel ratio of intake air supplied to the internal combustion engine is forced to increase/decrease, including the steps of: determining whether the operation under forced air-fuel ratio control is interrupted before completion of the system abnormality determination; when the operation under forced air-fuel control is interrupted, temporarily storing a parameter accumulated during the operation under forced air-fuel ratio control by the time of interruption; and when the internal combustion engine comes to satisfy the prescribed condition again, resuming the operation under forced air-fuel ratio control, and completing determination of the system abnormality using the stored parameter and parameter accumulated after resumption of the forced air-fuel ratio control.

Preferably, the step of completing abnormality determination includes the steps of performing a process of correcting the parameter corresponding to the interruption period of the operation under forced air-fuel ratio control, and continuing accumulation of the parameter after resumption of the operation under forced air-fuel ratio control.

Preferably, the parameter is oxygen storage amount of the catalyst accumulated based on air-fuel ratio and amount of fuel injection.

More preferably, the sensor is an oxygen sensor detecting oxygen in the exhaust gas. The step of completing the abnormality determination includes the step of detecting abnormality of the system by monitoring an output of the oxygen sensor when the oxygen storage amount exceeds a prescribed value.

According to the present invention, the possibility of successfully completing the process of determining whether the exhaust gas purifying system has abnormality or not can be increased.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following. embodiments of the present invention will be described in detail with reference to the figures. In the figures, the same or corresponding portions are denoted by the same reference characters and description thereof will not be repeated.

[Configurations of and around Internal Combustion Engine]

Figure 1:
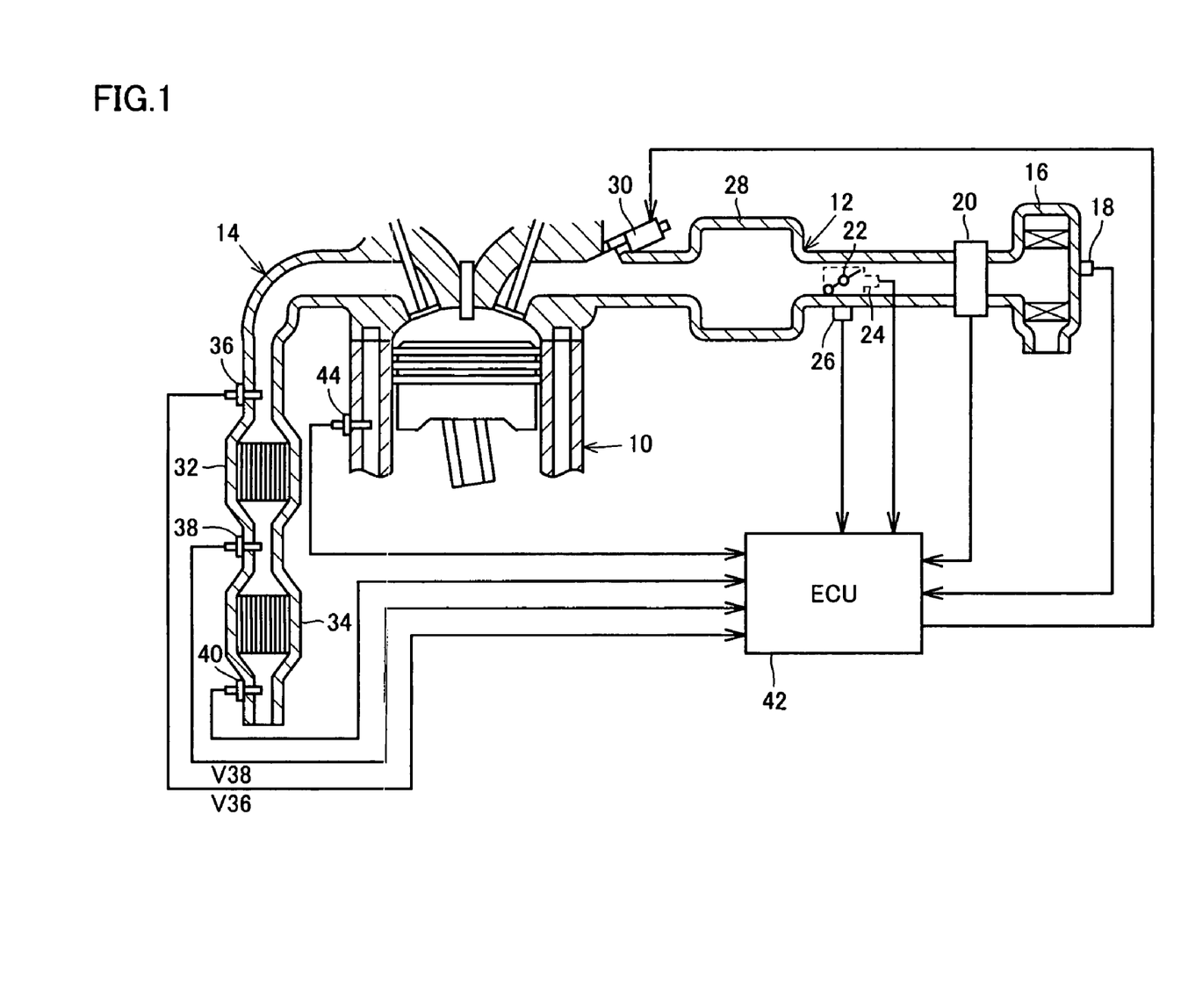
FIG. 1 is an illustration of configurations of and around an internal combustion engine 10, to which the exhaust gas purifying system in accordance with an embodiment of the present invention is applied.

FIG. 1 is an illustration of configurations of and around an internal combustion engine 10, to which the exhaust gas purifying system in accordance with an embodiment of the present invention is applied.

Referring to FIG. 1, an intake pipe 12 and an exhaust pipe 14 are communicated with internal combustion engine 10. Intake pipe 12 is provided with an air filter 16 at an upstream side end. On air filter 16, an intake air temperature sensor 18 is attached, for detecting the temperature of intake air THA (that is, outside air temperature).

An air flow meter 20 is arranged downstream of air filter 16. Air flow meter 20 is a sensor detecting an amount of intake air GA flowing through intake pipe 12. On the downstream side of air flow meter 20, a throttle valve 22 is provided. Near the throttle valve 22, a throttle sensor 24 detecting throttle open position TA, and an idle switch 26, which is turned on when throttle valve is fully closed, are provided.

On the downstream of throttle valve 22, a surge tank 28 is provided. Further downstream of the surge tank, a fuel injection valve 30 for injecting fuel to an intake port of internal combustion engine 10 is arranged.

In exhaust pipe 14, an upstream side catalyst 32 and a downstream side catalyst 34 are arranged in series. Catalysts 32 and 34 are capable of taking and storing some oxygen, and when the exhaust gas contains unburned component such as HC or CO, oxidize such component by using the oxygen stored therein, and when the exhaust gas contains oxide component such as NOx, reduce such component and store the emitted oxygen. The exhaust gas discharged from internal combustion engine 10 is processed in catalysts 32 and 34 and thereby purified.

In exhaust pipe 14, an air-fuel ratio sensor 36 arranged upstream of the upstream side catalyst 32, a first oxygen sensor 38 arranged between upstream side catalyst 32 and downstream side catalyst 34. and a second oxygen sensor 40 arranged downstream of the downstream side catalyst 34 are further provided.

Air-fuel ratio sensor 36 is a sensor detecting oxygen concentration in the exhaust gas. Output of the first and second oxygen sensors 38 and 40 change significantly before and after the oxygen concentration in the exhaust gas exceeds a prescribed value.

By monitoring the output of air-fuel ratio sensor 36, it is possible to detect the air-fuel ratio of the air-fuel mixture subjected to combustion in internal combustion engine 10, based on the oxygen concentration in the exhaust gas flowing to upstream side catalyst 32.

Further, by monitoring the output of first oxygen sensor 38, whether the exhaust gas processed by the upstream side catalyst 32 is fuel-rich (containing HC, CO) or fuel-lean (containing NOx) can be determined.

Further, by monitoring the output of second oxygen sensor 40, whether the exhaust gas that has passed through the downstream side catalyst 34 is fuel-rich (containing HC, CO) or fuel-lean (containing NOx) can be determined.

The exhaust gas purifying system in accordance with the present embodiment includes an ECU (Electronic Control Unit) 42. To ECU 42, in addition to various sensors and fuel injection valve 30 as described above, a water temperature sensor 44 for detecting the temperature of cooling water THW of internal combustion engine 10 and the like are connected.

In the system shown in FIG. 1, the exhaust gas discharged from internal combustion engine 10 is first purified by upstream side catalyst 32. Downstream side catalyst 34 performs purification of the exhaust gas that could not fully be purified by upstream side catalyst 32. As upstream side catalyst 32 is arranged at a position close to internal combustion engine 10, its temperature increases to an active temperature quickly after the start of operation of internal combustion engine 10. Therefore, upstream side catalyst 32 exhibits high performance of purifying exhaust gas immediately after the start of operation of internal combustion engine 10. In the present system, in order to constantly attain appropriate exhaust gas purifying capability, it is necessary to detect deterioration of upstream side catalyst 32 in an early stage.

Upstream side catalyst 32 emits oxygen to the fuel-rich exhaust gas, and takes in and stores excessive oxygen in the fuel-lean exhaust gas, thereby to purify the exhaust gas. Therefore, the purifying capability of upstream side catalyst 32 lowers as the maximum amount of oxygen that can be taken and stored in upstream side catalyst 32, that is, oxygen storage capacity OSC of upstream side catalyst 32, decreases. Therefore, the catalyst deterioration detecting apparatus in accordance with the present embodiment calculates the oxygen storage capacity OSC of upstream side catalyst 32, and determines whether upstream side catalyst 32 is deteriorated or not based on the calculated value.

In order to detect deterioration of the catalyst, forced air-fuel ratio control must be done. Unless the forced air-fuel ratio control is continued for some time, it is impossible to complete determination as to whether the exhaust gas purifying system is normal or not. Therefore, in the present embodiment, even when the forced air-fuel ratio control is interrupted by a process such as fuel cut in the middle of the process, parameter accumulated up to that time is utilized when the forced air-fuel ratio control resumes, and thus, possibility of completing determination as to whether the exhaust gas purifying system is normal or not in one vehicle operation is increased.

Outline of the exhaust gas purifying system in accordance with the present embodiment will be described. The exhaust gas purifying system includes: catalyst 32 arranged in exhaust pipe 14 of internal combustion engine 10; sensor 38 detecting the state of exhaust gas that has passed through catalyst 32; and ECU (Electronic Control Unit) 42 serving as an abnormality determining apparatus determining abnormality of the system by monitoring an output of sensor 38, in an operation under forced air-fuel ratio control executed when internal combustion engine 10 satisfies prescribed conditions, in which the air-fuel ratio of the intake air supplied to internal combustion engine 10 is forced up and down. When the operation under forced air-fuel ratio control is interrupted before completion of the system abnormality determination, the abnormality determining apparatus once stores a parameter accumulated during the operation under forced air-fuel ratio control before interruption, and when internal combustion engine 10 again comes to satisfy prescribed conditions, the apparatus resumes the operation under forced air-fuel ratio control and completes determination of system abnormality using the stored parameter as well as the parameter accumulated after the resumption of the operation under forced air-fuel ratio control.

In the present embodiment, the abnormality determining apparatus performs a parameter correcting process corresponding to the interruption period of operation under forced air-fuel ratio control, and continues accumulation of the parameter after resumption of the operation under forced air-fuel ratio control.

In the present embodiment, an example of the parameter is oxygen storage amount of catalyst 32 accumulated based on the air-fuel ratio and the amount of fuel injection.

Further, sensor 38 is an oxygen sensor detecting oxygen in the exhaust gas, and the abnormality determining apparatus detects abnormality of the system by monitoring an output of the oxygen sensor when the oxygen storage amount exceeds a prescribed value.

[Description of Operation Under Forced Air-Fuel Ratio Control]

Figure 2:
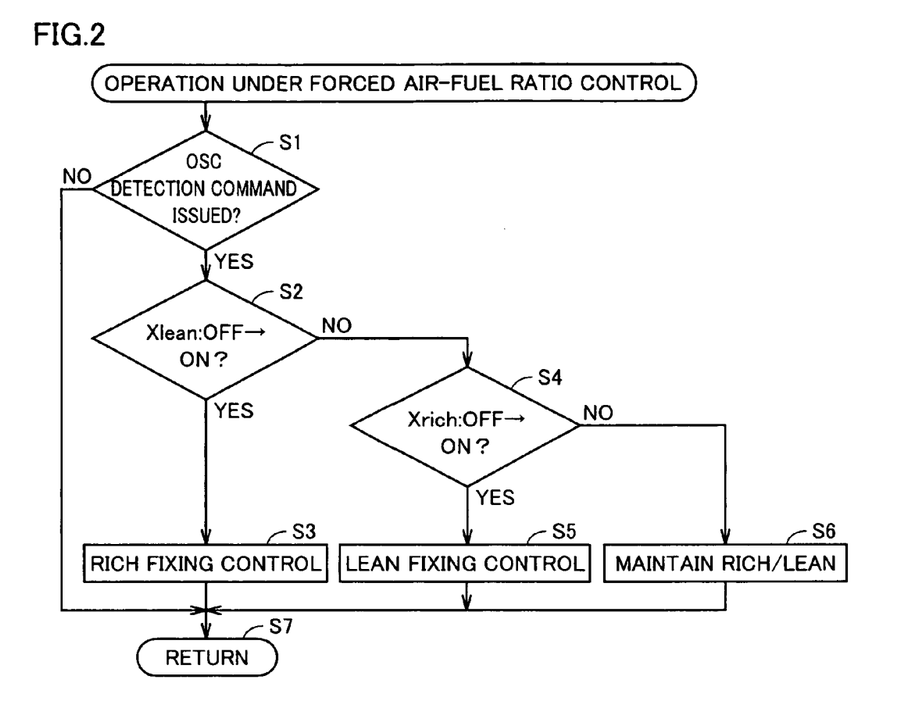
FIG. 2 is a flowchart of a forced air-fuel ratio control routine executed by an ECU 42 for detecting oxygen storage capacity OSC of an upstream side catalyst 32, in accordance with the present embodiment.

FIG. 2 is a flowchart executed by ECU 42 for detecting oxygen storage capacity OSC of upstream side catalyst 32.

In the routine of FIG. 2, first, at step S1, whether a command for detecting oxygen storage capacity OSC has been issued or not is determined.

When it is determined that the command for detecting oxygen storage capacity OSC has not been issued, the flow proceeds to step S7 without performing any process, and the present cycle ends. When it is determined that the command for detecting oxygen storage capacity OSC has been issued, the flow proceeds to step S2 at which whether a fuel-lean flag Xlean has been switched from an OFF state to an ON state is determined.

The fuel-lean flag Xlean is a flag that is ON while the first oxygen sensor 38 is generating an output lower than a fuel-lean determination value (hereinafter referred to as the "fuel-lean output"). Therefore, the condition of step S2 is satisfied when the output of first oxygen sensor 38 made a transition from a value exceeding the fuel-lean 25 determination value to a value lower than the determination value, from the last process cycle to the present process cycle. In the routine shown in FIG. 2, when this condition is satisfied, the flow proceeds to step S3, and control for fixing the air-fuel ratio of the air-fuel mixture to a prescribed value on the fuel-rich side is performed.

When it is determined at step S2 that the fuel-lean flag Xlean has not been switched from the OFF state to the ON state, the flow proceeds to step S4, at which whether a fuel-rich flag Xrich has been switched from an OFF state to an ON state or not is determined.

The fuel-rich flag Xrich is a flag that is ON while the first oxygen sensor 38 is generating an output exceeding a fuel-rich determination value (hereinafter referred to as the "fuel-rich output"). Therefore, the condition of step S4 is satisfied when the output of first oxygen sensor 38 made a transition from a value lower than the fuel-rich determination value to a value exceeding the determination value, from the last process cycle to the present process cycle. In the routine shown in FIG. 2, when this condition is satisfied, the flow proceeds to step S5, and control for fixing the air-fuel ratio of the air-fuel mixture to a prescribed value on the fuel-lean side is performed.

When it is determined at step S4 that the rich flag Xrich has not been switched from the OFF state to the ON state, fuel-rich-fixing control or fuel-lean-fixing control is executed to maintain the air-fuel ratio that has been used by that time.

More specifically, at step S6, when the air-fuel ratio by that time has been fuel-rich, control is done to fix the air-fuel ratio at a prescribed value on the fuel-rich side, as at step S3. When the air-fuel ratio by that time has been fuel-lean, control is done to fix the air-fuel ratio at a prescribed value on the fuel-lean side, as at step S5.

Figure 3:
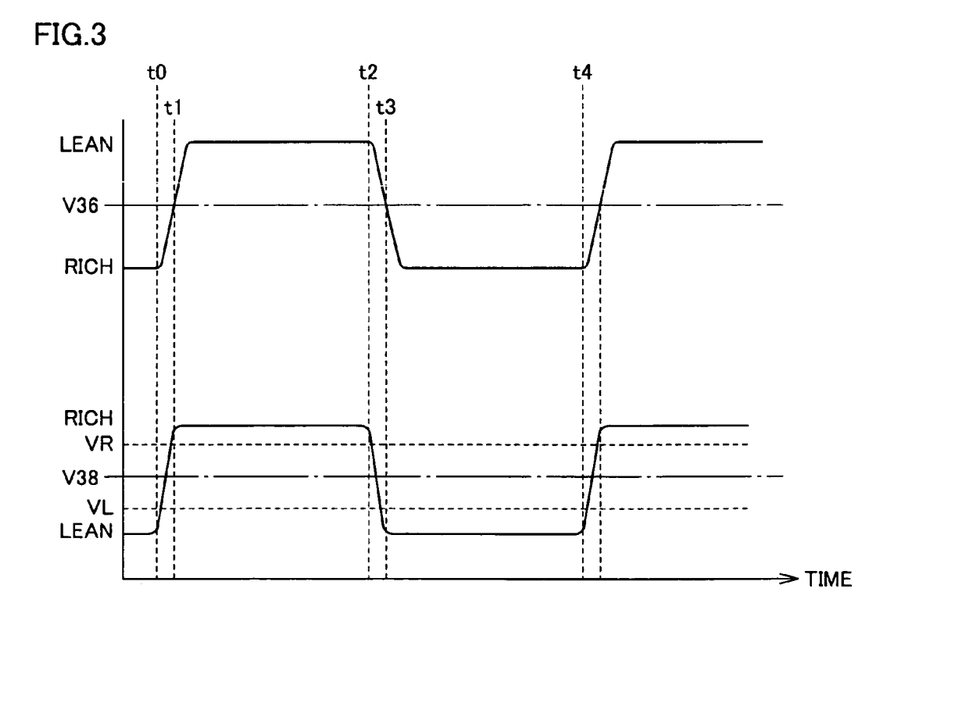
FIG. 3 is a timing chart showing an operation realized by ECU 42 executing the routine of FIG. 2.

FIG. 3 is a timing chart illustrating an operation realized by ECU 42 executing the routine shown in FIG. 2.

Referring to FIG. 3, a signal V36 represents an output of an air-fuel ratio sensor 36 while the oxygen storage capacity OSC is being detected. Signal V38 represents an output of the first oxygen sensor 38 at that time.

Referring to FIGS. 2 and 3, when the command for detecting oxygen storage capacity OSC is issued, the air-fuel ratio of the air-fuel mixture is fixed at a prescribed value on the fuel-rich side or fuel-lean side, by the process of subsequent step S6. FIG. 3 shows an example in which the air-fuel ratio has been fixed at a prescribed value on the fuel-rich side until time point to. While the air-fuel ratio of the air-fuel mixture is fixed to fuel-rich, output signal V36 of air-fuel ratio sensor 36 is biased to the fuel-rich side. Upstream side catalyst 32 emits stored oxygen to the exhaust gas, to purify the exhaust gas.

When the oxygen stored in upstream side catalyst 32 is fully discharged, purification of the exhaust gas in upstream side catalyst 32 stops, and low-oxygen exhaust gas containing HC or CO comes to flow to the downstream side. When the low-oxygen exhaust gas starts to flow to the downstream of the upstream side catalyst 32, the output of first oxygen sensor 38 becomes larger than the fuel-rich determination value VR indicating that the exhaust gas is fuel-rich.

Therefore, by monitoring the output of first oxygen sensor 38, it is possible to detect the time when the low-oxygen exhaust gas starts to flow to the downstream of the upstream side catalyst 32, that is, the time when the oxygen in the upstream side catalyst 32 is used up. In FIG. 3, the time corresponds to time point to.

When the output of the first oxygen sensor 38 becomes larger than the fuel-rich determination value VR, the fuel-rich flag Xrich turns ON at that time point, and the process of step S5 shown in FIG. 2 is executed. As a result, the air-fuel ratio of the air-fuel mixture is forced to and fixed at a prescribed value on the fuel-lean side. When the air-fuel ratio of the air-fuel mixture is fixed at the prescribed value on the fuel-lean side, the output of air-fuel ratio sensor 36 subsequently comes to a value biased to the fuel-lean side. The waveform shown in FIG. 3 shows a state that the output is inverted to the fuel-lean side value at time t1.

While the output of air-fuel ratio sensor 36 is on the fuel-lean side, that is, while high-oxygen exhaust gas is flowing to the upstream side catalyst 32, upstream side catalyst 32 takes in and stores the excessive oxygen in the exhaust gas, for purification. When this state continues, eventually, stored oxygen reaches the limit of oxygen storage capacity of upper side catalyst 32, and then, upstream side catalyst 32 can no longer purify the exhaust gas.

When such situation occurs, high-oxygen exhaust gas starts to flow to the downstream of the upstream side catalyst 32. When the high-oxygen exhaust gas starts to flow to the downstream of the upstream side catalyst 32, the output of first oxygen sensor 38 becomes smaller than the fuel-lean determination value VL indicating that the exhaust gas is fuel-lean. Therefore, by monitoring the output of first oxygen sensor 38, it is possible to detect the time when the high-oxygen exhaust gas starts to flow to the downstream of the upstream side catalyst 32, that is, the time when the oxygen up to the oxygen storage capacity OSC is stored in upstream side catalyst 32, can be detected. In FIG. 3, the time corresponds to time point t2.

When the output of first oxygen sensor 38 becomes smaller than the fuel-lean determination value VL, the fuel-lean flag turns on at that time, and the process of step S3 shown in FIG. 2 is executed. As a result, the air-fuel ratio of the air-fuel mixture is forced to and fixed at a prescribed value on the fuel-rich side. When the air-fuel ratio of the air-fuel mixture is fixed at the prescribed value on the fuel-rich side, the output of air-fuel ratio sensor 36 subsequently comes to a value biased to the fuel-rich side. The waveform shown in FIG. 3 shows a state that the output is inverted to the fuel-rich side value at time t3.

Then, ECU 42 maintains the air-fuel ratio of air-fuel mixture fuel-rich until the output of the first oxygen sensor again becomes larger than the fuel-rich determination value VR. When the output of first oxygen sensor 38 attains larger than VR at time t4, the process after time point t2 described above is executed repeatedly. As a result, the state in which the upstream side catalyst 32 has fully emitted the oxygen (state of minimum oxygen storage) and the state in which the upstream side catalyst 32 has stored oxygen to the limit of oxygen storage capacity (state of maximum oxygen storage) are realized repeatedly.

The amount of oxygen taken in and stored by upstream side catalyst 32 per unit time or the amount of oxygen discharged by upstream side catalyst 32 per unit time can be calculated based on the air-fuel ratio of the exhaust gas and the amount of intake air GA. In the following, both amounts will be referred to as oxygen storage amount OSA, which is positive when the oxygen is taken in and stored, and negative when the oxygen is discharged. The exhaust gas purifying system in accordance with the present embodiment calculates the oxygen storage capacity OSC by accumulating the oxygen storage amount OSA in the process of transition from the state of minimum oxygen storage to the state of maximum oxygen storage, or transition in the opposite direction.

[Detection of Oxygen Sensor Failure]

Figure 4:
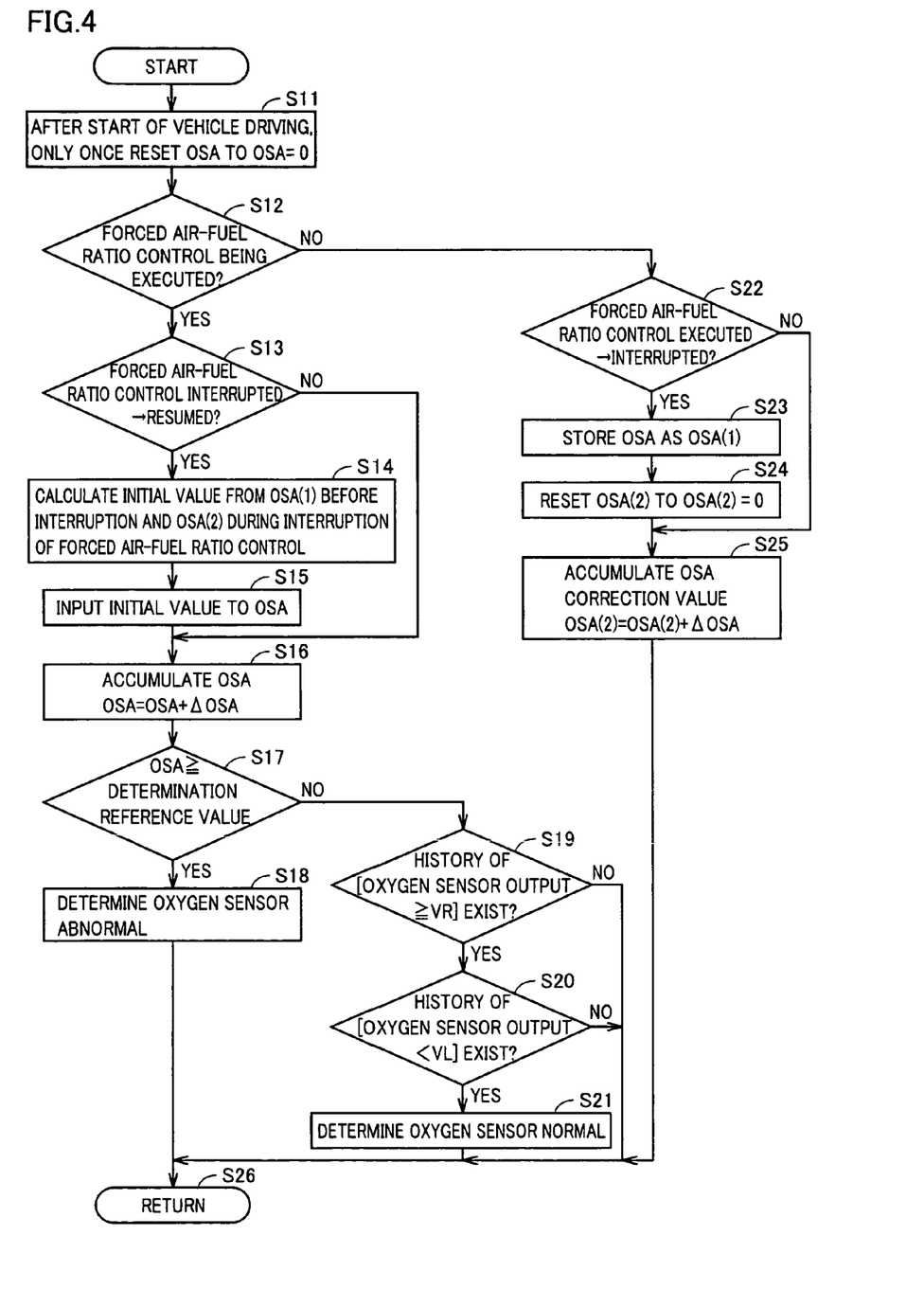
FIG. 4 is a flowchart representing a control structure of a program executed by ECU 42 for detecting a failure of the oxygen sensor during forced air-fuel ratio control.

FIG. 4 is a flowchart representing a control structure of a program executed by ECU 42 for detecting a failure of the oxygen sensor while forced air-fuel ratio control is being executed. The process of the flowchart is called from the main routine and executed at every prescribed time interval, or every time prescribed conditions are satisfied.

Referring to FIG. 4, when the process starts, at step S11, after the driver turns an ignition key and starts driving, the oxygen storage amount OSA is reset to zero only once.

At step S12, whether the forced air-fuel ratio control such as described with reference to FIG. 2 is being executed at present or not is determined. If the forced air-fuel ratio control is being executed at step S12, the flow proceeds to step S13, and if the forced air-fuel ratio control is not being executed, the flow proceeds to step S22.

At step S13, ECU 42 determines whether the forced air-fuel ratio control, which is being executed, is immediately after resumption from an interruption or not. In the following, how the interruption of forced air-fuel ratio control occurs will be described with reference to specific examples.

Figure 5:
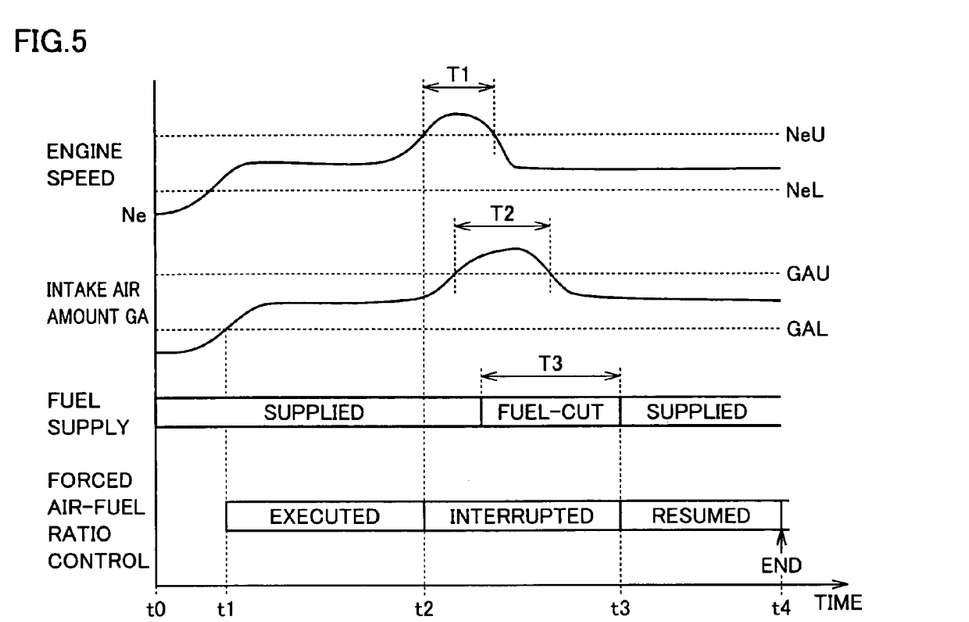
FIG. 5 shows exemplary conditions causing interruption of the forced air-fuel ratio control.

FIG. 5 illustrates exemplary conditions that cause interruption of forced air-fuel ratio control.

FIG. 5 shows variations in engine speed Ne and amount of intake air GA, as well as whether it is in a fuel-cut state or not, with respect to time on the abscissa.

The forced air-fuel ratio control is executed when the state of operation of the engine is rather preferable for determining deterioration of the catalyst. By way of example, the forced air-fuel ratio control is not preformed unless the engine speed is between an upper limit NeU and a lower limit NeL. Further, the forced air-fuel ratio control is not preformed unless the amount of intake air GA is between an upper limit GAU and a lower limit GAL. As to fuel supply, the forced air-fuel ratio control is not preformed in the fuel-cut state.

Therefore, referring to FIG. 5, the forced air-fuel ratio control cannot be performed in time periods T1, T2 and T3. From the foregoing, it is the case that driving starts at time point t0, execution of the forced air-fuel ratio control starts at time point t1 when engine speed Ne and amount of intake air GA both enter the prescribed ranges, the forced air-fuel ratio control is interrupted at time point t2 when the engine speed Ne goes out of the prescribed range, and at time point t3 after the end of time periods T1, T2 and T3, the forced air-fuel ratio control is resumed. At time point t4 when accumulation of the prescribed oxygen storage amount is completed and determination is made on deterioration of the catalyst or abnormality of oxygen sensor, the forced air-fuel ratio control ends.

Therefore, between time points t1 and t2, and between time points t3 and t4 of FIG. 5, process of steps S13 to S21 of FIG. 4 is performed. Between time points t2 and t3, the process of steps S22 to S25 is performed.

At step S13 of FIG. 4, if it is immediately after resumption of the forced air-fuel ratio control (in the example shown in FIG. 5, when the forced air-fuel ratio control is resumed at time point t3 and step S13 is executed for the first time), the flow proceeds to step S14, and otherwise, the flow proceeds to step S16.

At step S14, ECU 42 calculates an initial value of oxygen storage amount OSA from an accumulation value OSA(1) until the forced air-fuel ratio control is interrupted, as will be described later, and an accumulation value OSA(2) during the interruption of the forced air-fuel ratio control. Then, the flow proceeds to step S15, and as the oxygen storage amount OSA to be accumulated thereafter, the initial value calculated at step S14 is input. After the end of step S15, the flow proceeds to step S16.

At step S16, the oxygen storage amount OSA is accumulated. Accumulation is in accordance with Equation (1) below.

$$OSA = OSA + \Delta OSA \quad (1)$$

Here, $\Delta OSA$ can be calculated in accordance with Equation (2) below, where $\Delta A/F$ represents difference between actual air-fuel ratio and theoretical air-fuel ratio.

$$\Delta OSA = \text{amount of fuel injection} \times \Delta A/F \times \text{aerial oxygen concentration} \quad (2)$$

Figure 6:
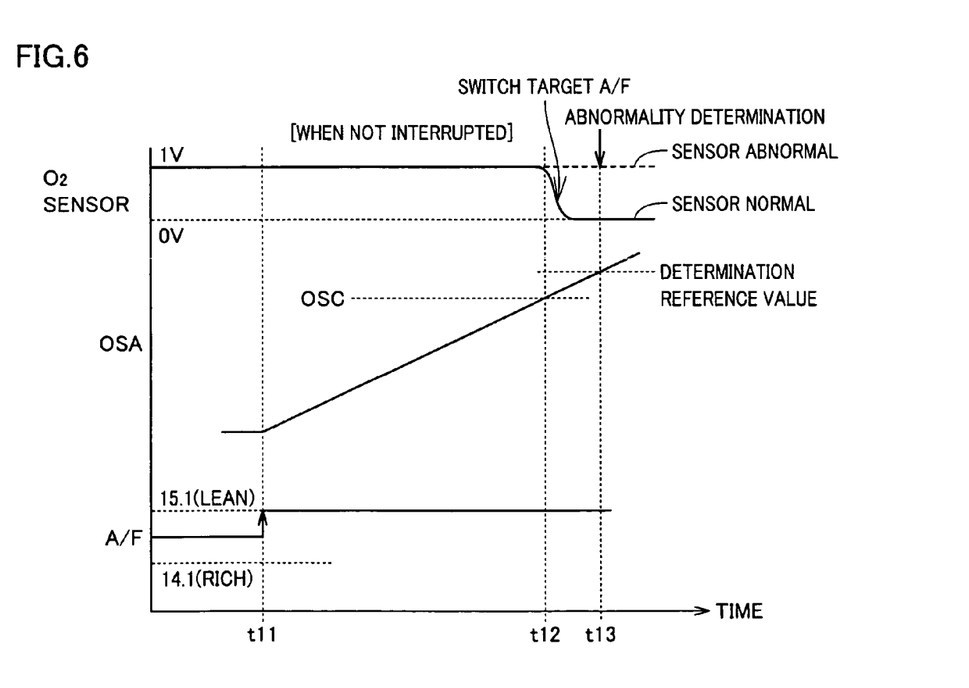
FIG. 6 is a diagram of waveforms showing abnormality determination of the oxygen sensor when the forced air-fuel ratio control is not interrupted.
Figure 7:
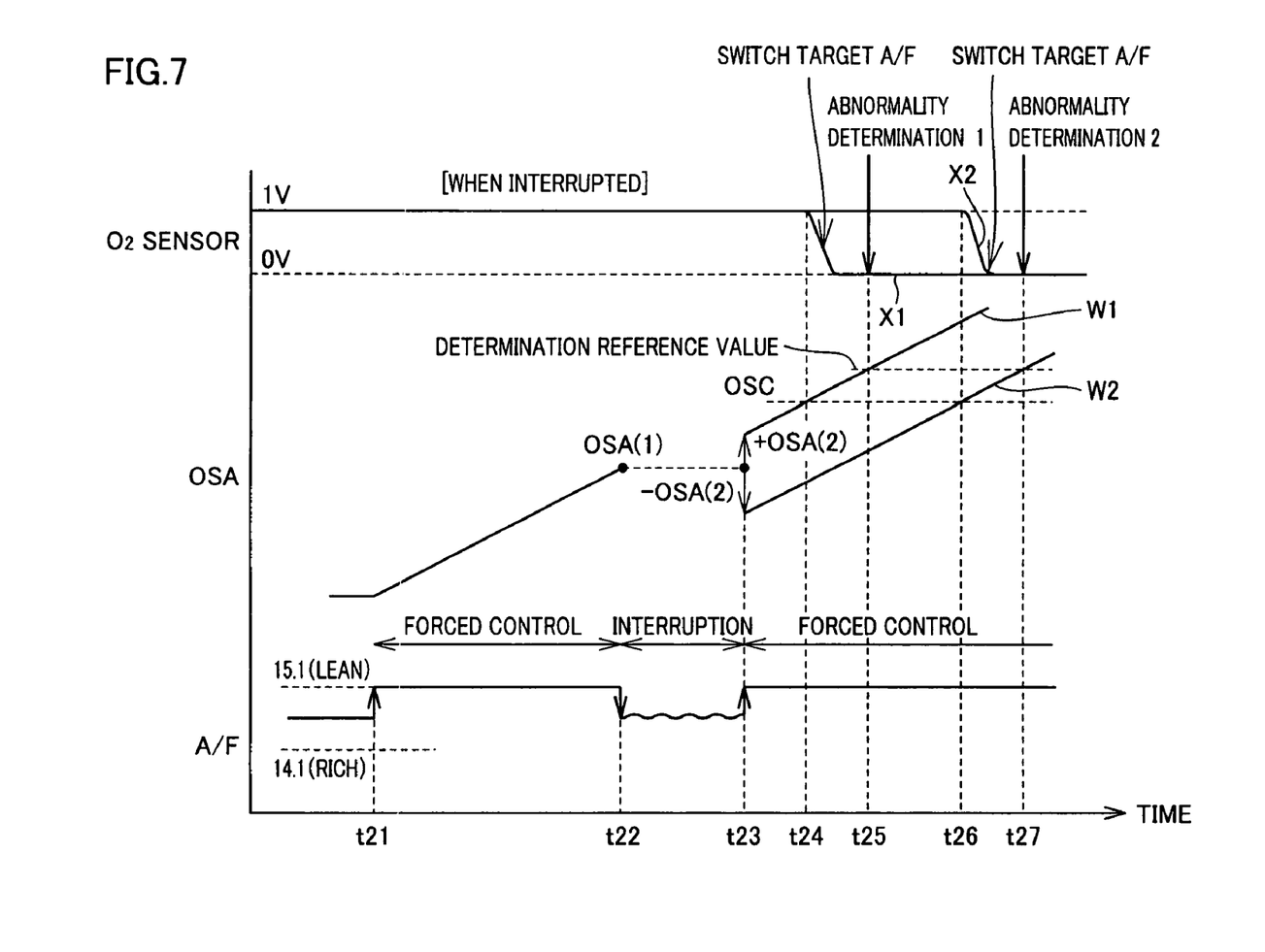
FIG. 7 is a diagram of waveforms showing an operation when the forced air-fuel ratio control is interrupted.

When the process of step S16 ends, whether the oxygen storage amount OSA is not lower than a determination reference value or not is determined at step S17. The determination reference value is slightly higher than the oxygen storage capacity OSC of the catalyst, as shown in FIGS. 6 and 7. If the condition "OSA≧ determination reference value" is satisfied at step S17, the flow proceeds to step S18, and otherwise, the flow proceeds to step S19.

When the flow proceeds to step S18, it is the case that the oxygen storage amount exceeding the oxygen storage capacity of the catalyst has been detected, and therefore, oxygen must be detected in the exhaust gas that has passed through the catalyst. Therefore, ECU 42 determines whether oxygen sensor 38 monitoring the exhaust gas is abnormal or not. If the output of oxygen sensor 38 is abnormal, a failure flag may be set inside, or an alarm lamp may be turned on to alert the driver. After the end of the process of step S18, the flow proceeds to step S26.

If the condition "OSA≧ determination reference value" is not satisfied at step S17, the flow proceeds to step S19. At step S19, whether there is a history that the output of oxygen sensor exceeded VR of FIG. 3 or not is determined. If there is such a history, the flow proceeds to step S20, and otherwise, the flow proceeds to step S26.

At step S20, whether there is a history that the output of oxygen sensor became lower than VL of FIG. 3 or not is determined. If it is determined at step S20 that there is such a history, the flow proceeds to step S21, and otherwise the flow proceeds to step S26.

At step S21, it is determined that the output of oxygen sensor varied with a prescribed amplitude, and thus, it is determined that the oxygen sensor operated normally. Then, the flow proceeds to step S26.

Next, the process when the flow proceeds from step S12 to S22 will be described. In this situation, the forced air-fuel ratio control is not executed.

At step S22, whether it is immediately after interruption of the forced air-fuel ratio control that has been executed or not is determined. If it is immediately after interruption (when the forced air-fuel ratio control is interrupted at time point t2 of FIG. 5 and the process of the flowchart shown in FIG. 4 is executed for the first time thereafter), the flow proceeds to step S23, and if it is not immediately after interruption, the flow proceeds to step S25.

At step S23, the oxygen storage amount OSA accumulated through steps S12, S13, S16, S17 and S19 is temporarily stored in a memory of ECU 42 as the value OSA(1) to be used for calculating the initial value at step S14. When it is immediately after interruption, at step S24, the value OSA(2) as a correction value used at step S14 is reset to 0. After the end of the process of step S24, the flow proceeds to step S25.

At step S25, accumulation of the correction value correcting the oxygen storage amount is done in accordance with Equation (3) below. Here, AOSA is calculated in accordance with Equation (2) above.

$$OSA(2) = OSA(2) + \Delta OSA \quad (3)$$

When the process of step S25 ends, the flow proceeds to step S26. At step S26, the control is passed to a prescribed main routine.

In the following, examples of control based on the flowchart of FIG. 4, in which the forced air-fuel ratio control is executed continuously without interruption and in which the forced air-fuel ration control is interrupted once, will be described.

FIG. 6 is a diagram of operation waveforms illustrating abnormality determination of the oxygen sensor, when the forced air-fuel ratio control is not interrupted.

Referring to FIG. 6, oxygen sensor 38 is provided at an outlet of catalyst 32 shown in FIG. 1, and when the oxygen concentration is high, it outputs about 0 volt and when the oxygen concentration is low, it outputs about 1 volt. Air-fuel ratio A/F is around the theoretical air-fuel ratio and normal control is executed, till time point t11.

At time point t11, forced control by which the air-fuel ratio A/F is forced to and fixed at the fuel-lean side (15.1) starts. If the forced air-fuel ratio control is not interrupted from t11 to t12, accumulation of oxygen storage amount OSA through steps S12, S13 and S16 of FIG. 4 is executed every time, and the oxygen storage amount OSA increases gradually, by ΔOSA per unit time.

When the oxygen storage amount OSA reaches the limit of oxygen storage capacity OSC as a result at time point t12, the oxygen sensor at the outlet of the catalyst detects the oxygen overflowing from the catalyst, and hence, its output changes from 1 volt to 0 volt.

At time t13, the accumulated oxygen storage amount OSA reaches the determination reference value slightly exceeding the oxygen storage capacity OSC of the catalyst, and by monitoring the output of the oxygen sensor at this time point, abnormality of the oxygen sensor is determined at step S18 of FIG. 4.

In the example of FIG. 6, when the output of oxygen sensor is changed from 1 volt to 0 volt, it is determined that the sensor is normal, and if the output of oxygen sensor is 1 volt and not changed, it is determined that the oxygen sensor is abnormal.

FIG. 7 is a diagram of operation waveforms illustrating an example in which the forced air-fuel ratio control is interrupted.

Referring to FIG. 7, the forced control of air-fuel ratio starts at time point t21, and the forced air-fuel ratio control is interrupted at time point t22 because of some reason such as the engine speed going out of the prescribed range, until time point t23.

At time point t22, as it is immediately after interruption of the forced control, the flow proceeds from step S12 to S22 in the flowchart of FIG. 4 and, thereafter, process of steps S23 and S24 is executed. As a result, the oxygen storage amount OSA that has been accumulated by that time is stored as a stored value OSA(1).

Between time points t22 and t23, the process of steps S22 to S25 of FIG. 4 is executed and, as a result, the correction value OSA(2) of OSA corresponding to the interrupted period is accumulated.

If the correction value OSA(2) is a positive value, accumulation of the oxygen storage amount is continued as represented by the waveform W1 after time point t23. In the example represented by the waveform W1, the oxygen storage amount of the catalyst exceeds the oxygen storage capacity OSC of the catalyst at time point t24, and in response, the output of the oxygen sensor changes from 1 volt to 0 volt, as indicated by the waveform X1. At time point t25, when OSA exceeds the prescribed determination reference value, abnormality determination of oxygen sensor of step S18 (Determination 1) is made.

When the correction value OSA(2) is a negative value, accumulation of the oxygen storage amount is continued as represented by the waveform W2. In the example represented by the waveform W2, accumulation of OSA is continued from time point t23 to t26, and when OSA exceeds oxygen storage capacity OSC at time point t26, the output of the oxygen sensor changes from 1 volt to 0 volt in response, as indicated by the waveform X2.

At time point t27, when waveform W2 reaches the determination reference value, abnormality determination of oxygen sensor of step S18 (Determination 2) is made in response.

Though FIG. 7 shows only an example in which the output of oxygen sensor varied normally, when the oxygen sensor is abnormal, the output of the oxygen sensor is kept at 1 volt and not changed, as in the example of FIG. 6. Therefore, by determining the output of the oxygen sensor using a prescribed threshold value between 0 volt and 1 volt, whether the oxygen sensor is acceptable or defective can be determined.

Figure 8:
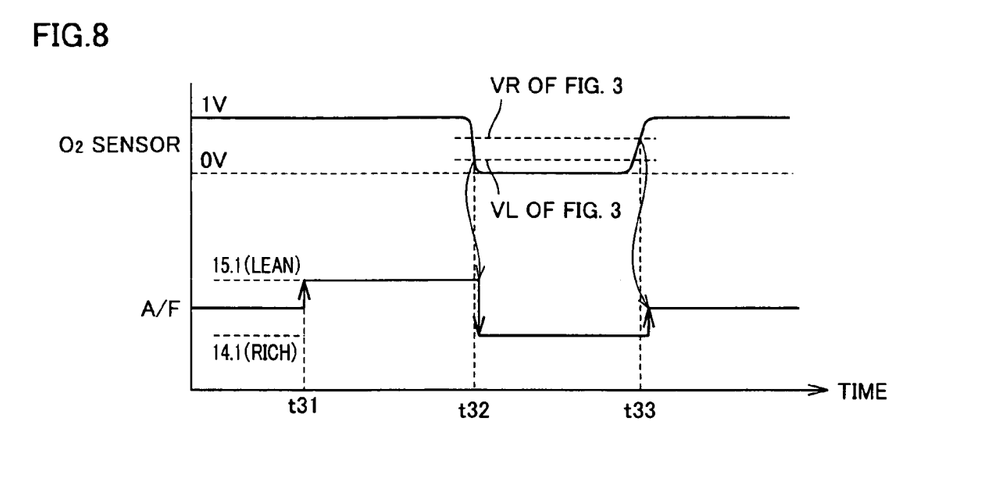
FIG. 8 is a diagram of waveforms related to steps S19 and S20 of FIG. 4, determining that the oxygen sensor is normal.

FIG. 8 is a diagram of operation waveforms illustrating steps S19 and S20 of FIG. 4, for determining the oxygen sensor as operating normally.

Referring to FIG. 8, between time points t31 and t32, control is performed in which the air-fuel ratio A/F is forced to and fixed at the fuel-lean side, that is, 15.1. At time point t32 after a prescribed time period from the start of fixing to the fuel-lean side, the oxygen sensor provided at the outlet of the catalyst detects oxygen as the catalyst can no longer store further oxygen, and hence, the output of the oxygen sensor changes from 1 volt to 0 volt.

In response to the change in the oxygen sensor output at time point t32, the air-fuel ratio is now forced to and fixed at the fuel-rich side, that is, 14.1. At time point t33 after a prescribed time period from the start of fixing to the fuel-rich side, the output of the oxygen sensor changes from 0 volt to 1 volt, and in response, forced control of the air-fuel ratio is terminated and normal control resumes.

As a result of execution of these forced control cycles, it is found that the output of oxygen sensor assumes both the state exceeding the fuel-rich determination value VR and the state lower than the fuel-lean determination value VL, and hence, through the steps S19 and S20, it is determined that the oxygen sensor is normal, at step S21 of FIG. 4.

As described above, in the present embodiment, when abnormality of an oxygen sensor provided on the downstream side of a catalyst is detected through forced air-fuel ratio control, even when the conditions allowing execution of the forced air-fuel control come to be no longer fulfilled and the forced air-fuel ratio control is interrupted, the oxygen storage amount of the catalyst accumulated up to that point is not wasted but utilized.

In addition to the oxygen storage amount accumulated halfway, the oxygen storage amount of the catalyst during the interruption is calculated and used for correction. Therefore, the time until oxygen sensor abnormality is determined after resumption of the forced air-fuel ratio control can be reduced, and the detection can be terminated earlier. Further, it is unnecessary to start the operation all over again even when the forced air-fuel ratio control is interrupted, and therefore, undesirable influence to the exhaust gas emission can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An exhaust gas purifying system, comprising:
   a catalyst arranged on an exhaust pipe of an internal combustion engine;

a sensor detecting a state of the exhaust gas passed through said catalyst; and an abnormality determining apparatus determining abnormality of the system by monitoring an output of said sensor in an operation under forced air-fuel ratio control executed when said internal combustion engine satisfies a prescribed condition, in which air-fuel ratio of intake air supplied to said internal combustion engine is forced to increase/decrease; wherein when said operation under forced air-fuel control is interrupted before completion of the determination of abnormality of said system, said abnormality determining apparatus once stores a parameter accumulated during said operation under forced air-fuel ratio control by the time of interruption, and when said internal combustion engine comes to satisfy said prescribed condition again, resumes said operation under forced air-fuel ratio control, and completes determination of said system abnormality using said stored parameter and parameter accumulated after resumption of the forced air-fuel ratio control.

2. The exhaust gas purifying system according to claim 1, wherein said abnormality determining apparatus performs a process of correcting said parameter corresponding to the interruption period of said operation under forced air-fuel ratio control, and continues accumulation of said parameter after resumption of said operation under forced air-fuel ratio control.

3. The exhaust gas purifying system according to claim 1, wherein said parameter is oxygen storage amount of said catalyst accumulated based on air-fuel ratio and amount of fuel injection.

4. The exhaust gas purifying system according to claim 3, wherein said sensor is an oxygen sensor detecting oxygen in the exhaust gas; and said abnormality determining apparatus detects abnormality of the system by monitoring an output of said oxygen sensor when said oxygen storage amount exceeds a prescribed value.

5. A method of determining abnormality of an exhaust gas purifying system including a catalyst arranged on an exhaust pipe of an internal combustion engine and a sensor detecting a state of the exhaust gas passed through said catalyst, for determining abnormality of the system by monitoring an output of said sensor in an operation under forced air-fuel ratio control executed when said internal combustion engine satisfies a prescribed condition, in which air-fuel ratio of intake air supplied to said internal combustion engine is forced to increase/decrease; comprising the steps of:

determining whether said operation under forced air-fuel ratio control is interrupted before completion of said system abnormality determination;

when said operation under forced air-fuel control is interrupted, temporarily storing a parameter accumulated during said operation under forced air-fuel ratio control by the time of interruption; and when said internal combustion engine comes to satisfy said prescribed condition again, resuming said operation under forced air-fuel ratio control, and completing determination of said system abnormality using said stored parameter and parameter accumulated after resumption of the forced air-fuel ratio control.

6. The method of determining abnormally of an exhaust gas purifying system according to claim 5, wherein said step of completing abnormality determination includes the steps of performing a process of correcting said parameter corresponding to the interruption period of said operation under forced air-fuel ratio control, and continuing accumulation of said parameter after resumption of said operation under forced air-fuel ratio control.

7. The method of determining abnormally of an exhaust gas purifying system according to claim 5, wherein said parameter is oxygen storage amount of said catalyst accumulated based on air-fuel ratio and amount of fuel injection.

8. The method of determining abnormally of an exhaust gas purifying system according to claim 7, wherein said sensor is an oxygen sensor detecting oxygen in the exhaust gas; and said step of completing the abnormality determination includes the step of detecting abnormality of the system by monitoring an output of said oxygen sensor when said oxygen storage amount exceeds a prescribed value.

* * * * *